US009556809B2

(12) United States Patent
Klingbeil et al.

(10) Patent No.: US 9,556,809 B2
(45) Date of Patent: Jan. 31, 2017

(54) SYSTEM AND METHOD FOR OPTIMAL FUELING OF AN ENGINE

(71) Applicant: General Electric Company, Schenectady, NY (US)

(72) Inventors: Adam Edgar Klingbeil, Ballston Lake, NY (US); Thomas Michael Lavertu, Clifton Park, NY (US); Ricardo Hernandez Pereira, São Carlos (BR); Henrique Moritz, Rio de Janeiro (BR)

(73) Assignee: General Electric Company, Niskayuna, NY (US)

( * ) Notice: Subject to any disclaimer, the term of this patent is extended or adjusted under 35 U.S.C. 154(b) by 91 days.

(21) Appl. No.: 14/568,496

(22) Filed: Dec. 12, 2014

(65) Prior Publication Data

US 2016/0169142 A1 Jun. 16, 2016

(51) Int. Cl.
*F02D 41/00* (2006.01)
*F02D 19/06* (2006.01)
(Continued)

(52) U.S. Cl.
CPC ......... *F02D 41/0027* (2013.01); *F02D 19/061* (2013.01); *F02D 19/0692* (2013.01);
(Continued)

(58) Field of Classification Search
CPC .... Y02T 10/36; F02D 41/0025; F02D 19/081; F02D 41/0027; F02D 19/0647; F02D 19/0689; F02D 19/0692; F02D 19/084; F02D 19/0694; F02D 19/08; F02D 19/087; F02D 41/1446; F02D 41/1448; F02D 41/008; F02D 41/0062; F02D 35/026; F02D 19/061; F02D 19/10; F02D 2200/0406; F02D 2200/0414; F02D 29/06; F02M 26/08; F02M 26/43; F02M 26/23; F02B 2043/103; F02B 29/0412
(Continued)

(56) References Cited

U.S. PATENT DOCUMENTS 3,815,563 A 6/1974 Stinsa
6,000,384 A 12/1999 Brown et al.
(Continued)

FOREIGN PATENT DOCUMENTS

JP 4427783 B2 3/2010
JP 2013148057 A 8/2013
(Continued)

OTHER PUBLICATIONS

Liu et al., "Modeling and experimental validation of air-fuel ratio under individual cylinder fuel injection for port-injection engines", Automation Science and Engineering (CASE), IEEEXplore, Aug. 20-24, 2012, pp. 256-260, Conference Location :Seoul.
(Continued)

*Primary Examiner* — Sizo Vilakazi
(74) *Attorney, Agent, or Firm* — Joseph J. Christian

(57) ABSTRACT

A method for optimal fueling of an engine is disclosed. The method includes determining a quantity of exhaust residuals in each cylinder among a plurality of cylinders in the engine. Further, the method includes determining at least one of an intake and exhaust manifolds temperature, at least one of an intake and exhaust manifolds pressure, and a quantity of a first fuel being injected to each cylinder, and calculating a characteristic temperature of each cylinder based on the quantity of exhaust residuals, at least one of the intake and exhaust manifolds temperature and pressure, and the quantity of the first fuel. The method further includes determining a substitution rate of the first fuel for each cylinder based on the characteristic temperature, and controlling at least one of
(Continued)

Figure 1:
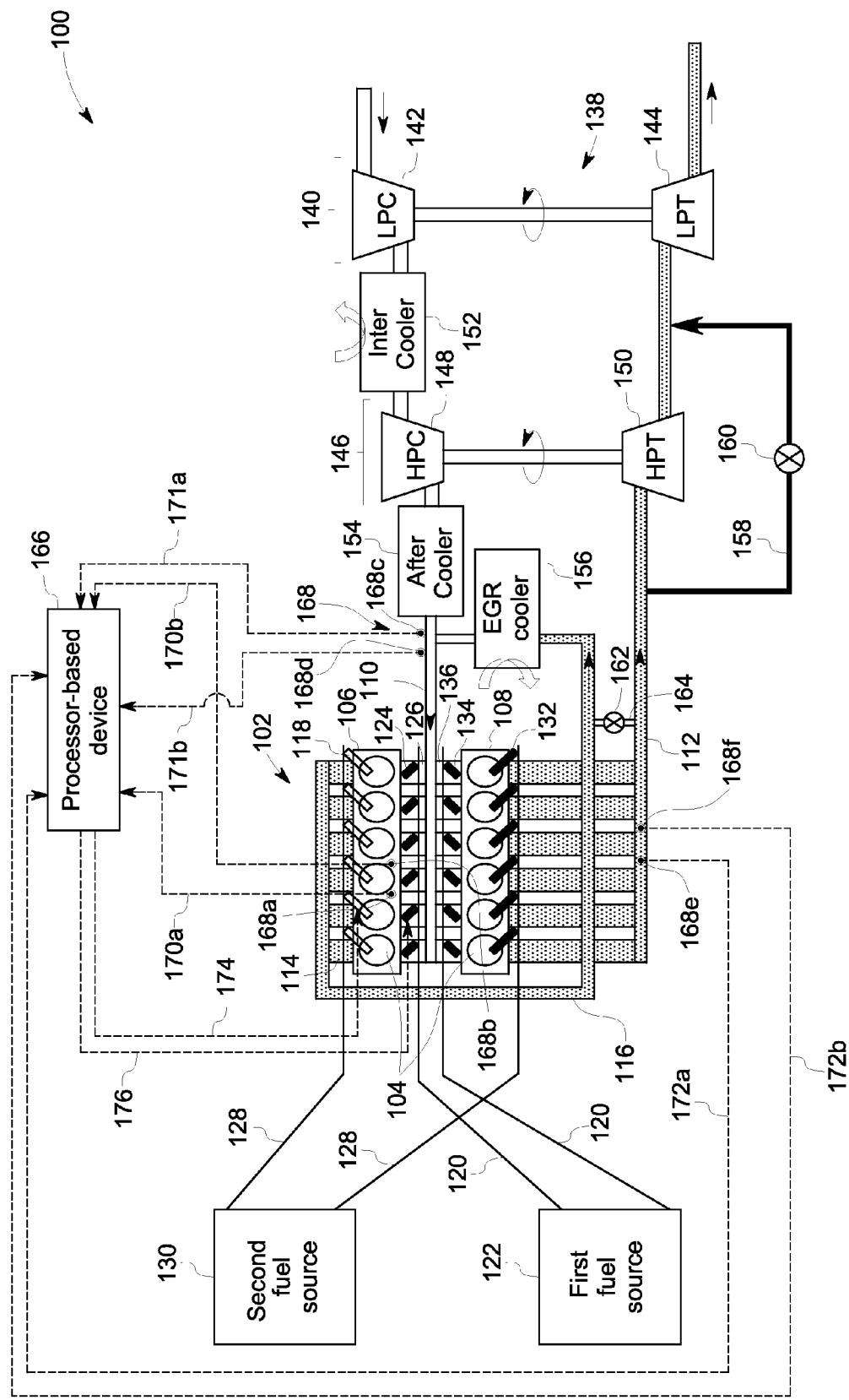

the quantity of the first fuel, and a quantity of a second fuel being injected to each cylinder based on the substitution rate.

19 Claims, 4 Drawing Sheets

(51) Int. Cl.
    *F02D 19/08*     (2006.01)
    *F02D 41/14*     (2006.01)
    *F02D 35/02*     (2006.01)
    *F02D 19/10*     (2006.01)
    *F02B 43/10*     (2006.01)
    *F02B 29/04*     (2006.01)
    *F02D 29/06*     (2006.01)

(52) U.S. Cl.
    CPC ........... *F02D 19/081* (2013.01); *F02D 19/10* (2013.01); *F02D 35/026* (2013.01); *F02D 41/008* (2013.01); *F02D 41/0025* (2013.01); *F02D 41/0062* (2013.01); *F02D 41/1446* (2013.01); *F02D 41/1448* (2013.01); *F02M 26/08* (2016.02); *F02M 26/43* (2016.02); *F02B 29/0412* (2013.01); *F02B 2043/103* (2013.01); *F02D 29/06* (2013.01); *F02D 2200/0406* (2013.01); *F02D 2200/0414* (2013.01); *F02M 26/23* (2016.02)

(58) Field of Classification Search
    USPC .................................. 123/575, 576, 577, 578
    See application file for complete search history.

(56) References Cited

U.S. PATENT DOCUMENTS

| | | | |
|---|---|---|---|
| 6,158,418 A | 12/2000 | Brown et al. | |
| 6,202,601 B1 | 3/2001 | Ouellette et al. | |
| 6,371,092 B1 | 4/2002 | Guglielmo et al. | |
| 6,640,773 B2 | 11/2003 | Ancimer et al. | |
| 6,675,748 B2 | 1/2004 | Ancimer et al. | |
| 6,912,992 B2 | 7/2005 | Ancimer et al. | |
| 7,647,916 B2 | 1/2010 | Leone et al. | |
| 7,720,592 B2 | 5/2010 | Leone et al. | |
| 7,739,999 B2 | 6/2010 | Kang et al. | |
| 7,801,665 B2 | 9/2010 | Buckland et al. | |
| 7,823,563 B2 | 11/2010 | Jankovic et al. | |
| 7,987,040 B2 | 7/2011 | Buckland et al. | |
| 8,180,553 B2 | 5/2012 | Buckland et al. | |
| 8,364,384 B2 | 1/2013 | Pursifull | |
| 8,571,783 B2 | 10/2013 | Buckland et al. | |
| 2006/0096577 A1 | 5/2006 | Araki | |
| 2011/0288751 A1 | 11/2011 | Kurtz | |
| 2012/0210988 A1 | 8/2012 | Willi | |
| 2013/0073183 A1 | 3/2013 | Cohn et al. | |
| 2014/0000552 A1* | 1/2014 | Glugla | F02D 43/00 123/295 |
| 2014/0032082 A1 | 1/2014 | Gehrke et al. | |
| 2014/0158088 A1 | 6/2014 | Gehrke et al. | |
| 2015/0233282 A1* | 8/2015 | Bandyopadhyay | F02B 37/00 60/603 |
| 2016/0108873 A1* | 4/2016 | Jackson | F02M 43/00 123/445 |

FOREIGN PATENT DOCUMENTS

| | | |
|---|---|---|
| RU | 2347926 C1 | 2/2009 |
| RU | 2012127431 A | 1/2014 |

OTHER PUBLICATIONS

Unofficial English Translation of Search Report issued in connection with corresponding EA Application No. 201592050 on May 19, 2016.

\* cited by examiner

SYSTEM AND METHOD FOR OPTIMAL FUELING OF AN ENGINE

BACKGROUND

The present invention relates generally to engines and, in particular, to systems and methods for determining an optimal substitution rate of fuels, and controlling the fuels being injected to a plurality of cylinders of such engines.

Generally, engines such as dual-fuel engines are alternative internal combustion engines designed to run on more than one fuel each stored in separate vessels. The dual-fuel engines are known for various applications, such as generator sets, engine-driven compressors, engine driven pumps, mechanical machines, off-highway trucks and others. Such dual-fuel engines are capable of burning varying proportions of the resulting blend of fuels in the combustion chamber and the fuel injection and/or spark timing may be adjusted according to the blend of fuels in the combustion chamber.

The dual-fuel engines operating with a high fraction of non-premixed, direct injected fuel, such as diesel fuel, and with a less fraction of premixed fuel, such as natural gas may have uneven exhaust residuals between cylinders due to flow dynamics which may limit natural gas substitution in one or more cylinders. Such exhausts residuals may include pollutants such as carbon oxides (e.g., carbon monoxide), nitrogen oxides ($NO_x$), sulfur oxides ($SO_x$), and particulate matter (PM), which may be detrimental to the environment. The amount and relative proportion of these pollutants may vary according to the fuel-air mixture, compression ratio, injection timing, environmental conditions (e.g., atmospheric pressure, temperature, etc.), and so forth. Similarly, the dual-fuel engines operating with the high fraction of premixed fuel and with the less fraction of non-premixed fuel may be susceptible to knocking in each cylinder and may have peak cylinder pressure issue. Therefore, determination of an optimal substitution rate of certain amount of the heavy fuel with the lighter fuel using one or more known techniques may be difficult and unpredictable.

Thus, there is a desire for an improved system and method for engines operating on more than one fuel.

BRIEF DESCRIPTION

In one embodiment, a method for optimal fueling of an engine is provided. The method includes determining a quantity of exhaust residuals in each cylinder among a plurality of cylinders in the engine and determining at least one of an intake and exhaust manifolds temperature, at least one of an intake and exhaust manifolds pressure, and a quantity of a first fuel being injected to each cylinder. Further, the method includes calculating a characteristic temperature of each cylinder based on the quantity of exhaust residuals, at least one of the intake and exhaust manifolds temperature, at least one of the intake and exhaust manifolds pressure, and the quantity of the first fuel. The method further includes determining a maximum allowable substitution rate of the first fuel for each cylinder based on the characteristic temperature and controlling at least one of the quantity of the first fuel, and a quantity of a second fuel being injected to each cylinder based on the determined substitution rate. In such embodiments, the quantity of first fuel being injected to each cylinder is either less than or equal to the quantity of first fuel being calculated per the determined substitution rate. The exhaust residuals in such embodiments include a fraction of burnt combustion gases remaining in each cylinder between each engine cycle among a plurality of engine cycles. In one embodiment, the term "substitution rate" may be defined as a fraction of energy from the first fuel with respect to total fuel energy (i.e. sum of first and second fuels) in each cylinder.

In another embodiment, a system for optimal fueling an engine such as a dual-fuel engine is provided. The system includes the dual-fuel engine and a processor-based device. The dual-fuel engine includes a plurality of cylinders coupled to an intake manifold configured to feed a flow of air to the plurality of cylinders through a plurality of intake passages, and a port injector disposed in each of the plurality of intake passages and configured to inject a first fuel from a first fuel source, and a direct injector disposed in each cylinder and configured to inject a second fuel from a second fuel source. The processor-based device is configured to be communicatively coupled to a plurality of sensors, the port injector, and the direct injector. Further, the processor-based device is configured to determine a quantity of exhaust residuals in each cylinder, at least one of an intake and exhaust manifolds temperature, at least one of an intake and exhaust manifolds pressure, and a quantity of a first fuel being injected to each cylinder. The processor-based device is configured to calculate a characteristic temperature of each cylinder based on the quantity of exhaust residuals, at least one of the intake and exhaust manifolds temperature, at least one of the intake and exhaust manifolds pressure, and the quantity of the first fuel. Further, the processor-based device is configured to determine an allowable substitution rate of the first fuel for each cylinder based on the characteristic temperature and control at least one of the quantity of the first fuel, and a quantity of the second fuel being injected to each cylinder based on the determined substitution rate.

In yet another embodiment, a system for optimal fueling an engine such as a dual-fuel engine is provided. The system includes the dual-fuel engine and a processor-based device. The dual-fuel engine includes a plurality of cylinders coupled to an intake manifold configured to feed a mixture of air and a first fuel to the plurality of cylinders through a plurality of intake passages, and a direct injector disposed in each cylinder among the plurality of cylinders and configured to inject a second fuel from a second fuel source. In such embodiments, the first fuel is provided from a first fuel source. The processor-based device is configured to be communicatively coupled to a plurality of sensors, the first fuel source, and the direct injector. Further, the processor-based device is configured to determine a quantity of exhaust residuals in each cylinder and determine at least one of an intake and exhaust manifolds temperature, at least one of an intake and exhaust manifolds pressure, and a quantity of a first fuel being injected to each cylinder. The processor-based device is configured to calculate a characteristic temperature of each cylinder based on the quantity of exhaust residuals, at least one of the intake and exhaust manifolds temperature, at least one of the intake and exhaust manifolds pressure, and the quantity of the first fuel. Further, the processor-based device is configured to determine a substitution rate of the first fuel for each cylinder based on the characteristic temperature and control at least one of the quantity of the first fuel, and a quantity of the second fuel being injected to each cylinder based on the determined substitution rate.

DRAWINGS

Figure 2:
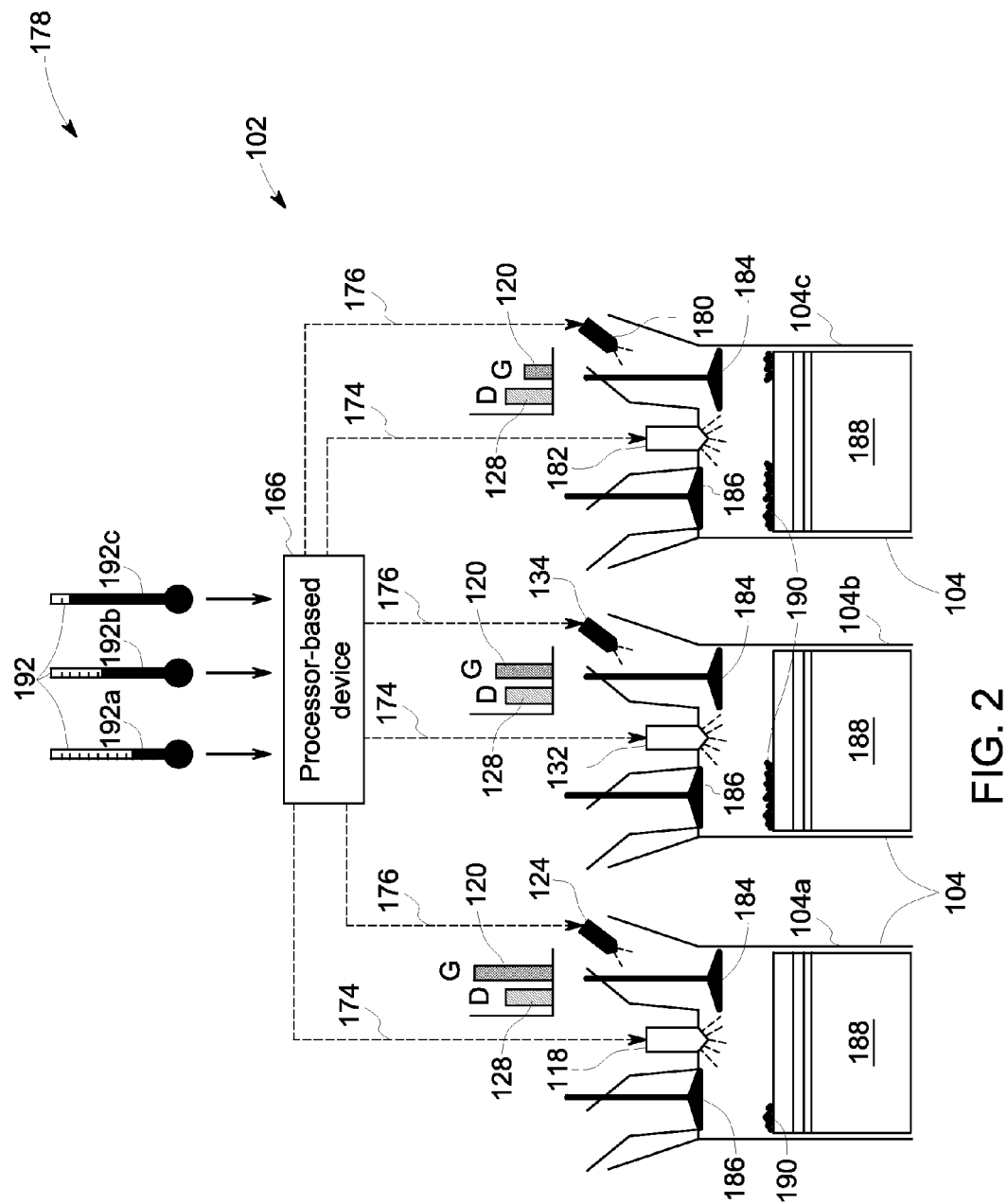
Figure 3:
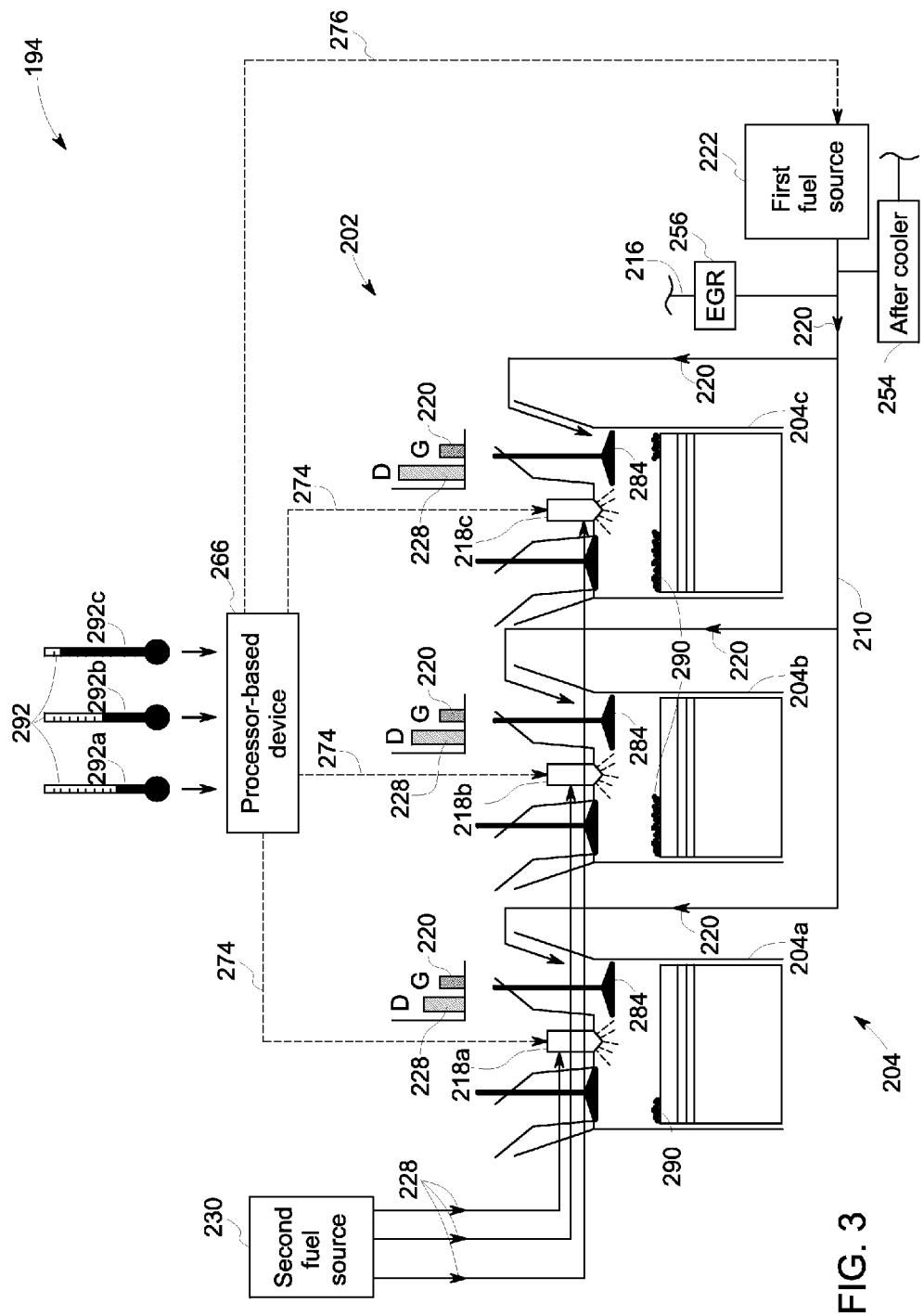
Figure 4:
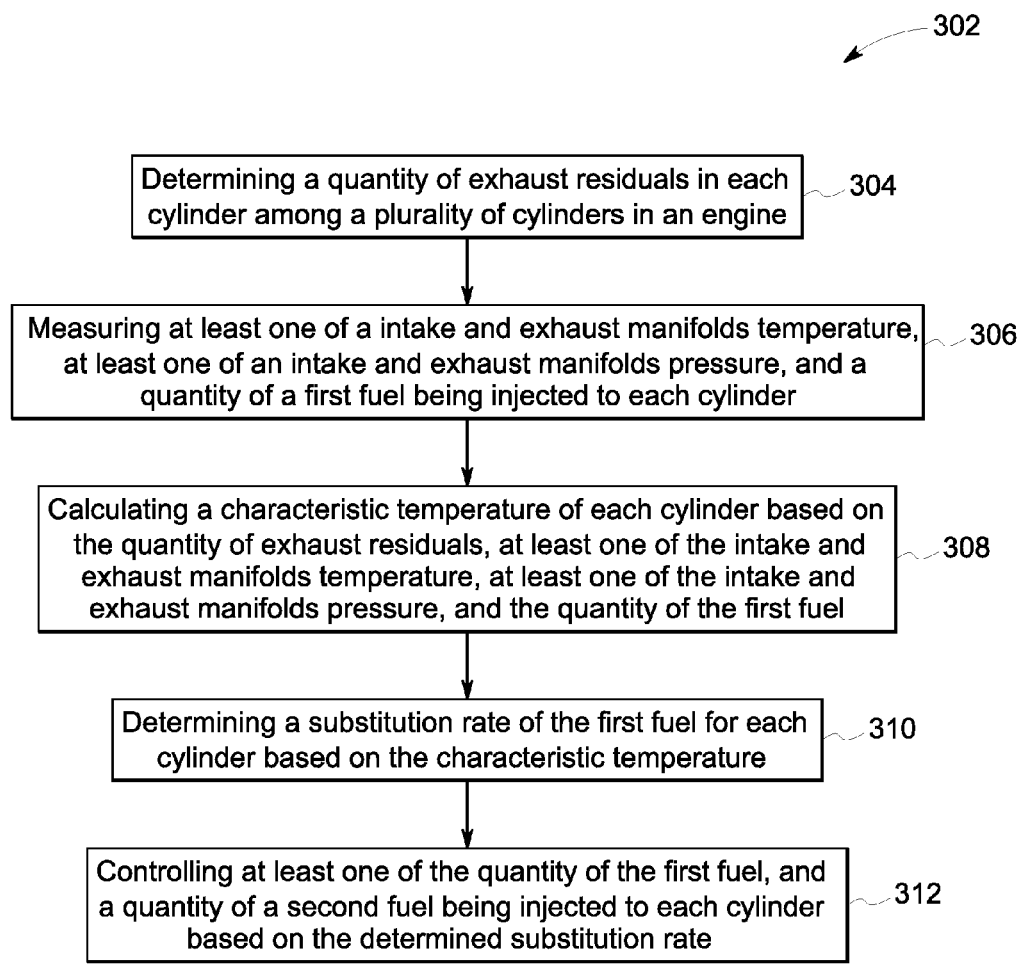

These and other features and aspects of embodiments of the present invention will become better understood when the following detailed description is read with reference to the accompanying drawings in which like characters represent like parts throughout the drawings, wherein:

FIG. 1 schematically shows a system for controlling a dual-fuel engine in accordance with one exemplary embodiment;

FIG. 2 schematically shows a portion of the system to control a port injector and a direct injector for injecting fuels to a plurality of cylinders in the dual-fuel engine in accordance with the exemplary embodiment of FIG. 1;

FIG. 3 schematically shows a portion of a system to control a first fuel source and a direct injector for fumigation and direction injection of fuels respectively to a plurality of cylinders in accordance with one exemplary embodiment; and FIG. 4 is a flow chart of a method for controlling a dual-fuel engine in accordance with the exemplary embodiments of FIGS. 1, 2, and 3.

DETAILED DESCRIPTION

Embodiments discussed herein disclose a new method and system for optimal fueling of an engine, such as a dual-fuel engine. The invention discloses efficiently determining an optimal substitution rate of fuels, and controlling the fuels being injected to a plurality of cylinders so as to optimize the fuel injection to the engine. The system disclosed in the present invention includes the dual-fuel engine and a processor-based device which is configured to regulate the fuel injection in the dual-fuel engine by determining the optimal substitution rate of the fuels, and controlling the fuels being injected to each cylinder in the engine. The method employed in such system includes determining a quantity of exhaust residuals in each cylinder and determining a plurality of parameters related to each cylinder. The method further includes calculating a characteristic temperature of each cylinder based on the plurality of parameters and the quantity of exhaust residuals, and determining a substitution rate that may be achieved of the first fuel for each cylinder based on the characteristic temperature. Further, the method includes controlling the quantity of the first fuel and a quantity of a second fuel being injected to each cylinder based on the determined substitution rate that may be achieved. In such embodiments, the quantity of first fuel being injected to each cylinder is either less than or equal to the quantity of first fuel being calculated per the determined substitution rate. The plurality of parameters may include at least one of an intake and exhaust manifolds temperature, at least one of an intake and exhaust manifolds pressure, and a quantity of a first fuel being injected to each cylinder.

Referring to the drawings wherein identical reference numerals denote the same elements throughout the various views, FIG. 1 schematically shows a system 100 for controlling a dual-fuel engine 102 in accordance with an example of the present invention. In the illustrated embodiment, the dual-fuel engine 102 includes a plurality of cylinders 104 which may be grouped as a donor cylinder group 106 and a non-donor cylinder group 108. The donor cylinder group 106 having multiple donor cylinders coupled to an intake manifold 110 that is configured to feed a flow of air to the donor cylinder group 106. The non-donor cylinder group 108 is coupled to the intake manifold 110 and an exhaust manifold 112. The intake manifold 110 is further configured to feed air to the non-donor cylinder group 108. The dual-fuel engine 102 also includes an exhaust channel 114 extending from the donor cylinder group 106 to the intake manifold 110 for recirculating exhaust emissions in an exhaust gas recirculation (EGR) loop 116 from each donor cylinder to both donor cylinder group 106, and non-donor cylinder group 108 via the intake manifold 110. In certain other embodiments, the dual-fuel engine 102 may not have an EGR loop 116, the donor cylinder group 106, and the non-donor cylinder group 108. In such embodiments, all cylinders currently shown as part of the donor and non-donor cylinder groups 106, 108 may be construed as the plurality of cylinders 104 of the dual-fuel engine 102.

The system 100 includes a port injector 124 disposed in each of a plurality of intake passages 126 configured to inject a first fuel 120 from a first fuel source 122. Further, each cylinder 104 of the donor cylinder group 106 includes a direct injector 118 that injects a second fuel 128 from a second fuel source 130. Similarly, each cylinder 104 of the non-donor cylinder group 108 includes a direct injector 132 and a port injector 134. In one embodiment, the port injector 134 disposed in each of a plurality of second intake passages 136 and configured to inject the first fuel 120 from the first fuel source 122, while the direct injector 132 is configured to inject the second fuel 128 from the second fuel source 130. In one embodiment, the first fuel 120 may include at least one of natural gas, nitrogen, hydrogen, syngas, gasoline, ethanol, carbon monoxide, propane, biogas, liquid petroleum gas (LPG). The second fuel 128 includes a diesel fuel.

Furthermore, the system 100 includes a two-staged turbocharger 138 configured to provide compressed air to the dual-fuel engine 102 through the intake manifold 110. The two-staged turbocharger 138 includes a first stage turbocharger 140 that includes a low pressure compressor 142 and a low pressure turbine 144. The two-staged turbocharger 138 also includes a second stage turbocharger 146 having a high pressure compressor 148 and a high pressure turbine 150. As shown in FIG. 1, the low pressure compressor 142, the high pressure compressor 148 and the intake manifold 110 are in fluid communication with each other. Ambient air is routed through the low pressure compressor 142 and the high pressure compressor 148 for sufficient compression prior to being directed into the intake manifold 110. The flow of air is cooled in two stages in an inter-cooler 152 located between the compressors 142, 148 and in an after-cooler 154 located between the high pressure compressor 148 and the intake manifold 110. The exhaust emissions in the exhaust gas recirculation loop 116 are also cooled in an exhaust gas recirculation cooler 156 (EGR-cooler) prior to being directed into the intake manifold 110. In one embodiment, each of the inter-cooler 152, after-cooler 154 and the EGR-cooler 156 is a heat exchanger that may utilize a fluid for extracting heat thereby cooling the flow of air and exhaust emissions flowing through each of the cooler. It may be obvious to one skilled in the art that the invention described herein may be applied to system 100 with or without EGR cooler 156 as well as for the system 100 with other forms of turbocharging 138, for example, a supercharging, a single staged turbocharging, and the like, without deviating from the scope of the present invention described herein. Further, the system 100 may be envisioned with no turbocharging 138 and such embodiments should not be construed as a limitation of the present invention.

The exhaust emissions flowing out of the non-donor cylinder group 108 through the exhaust manifold 112 are routed through the high pressure turbine 150 and the low pressure turbine 144 prior to being released out of the system 100. As shown in FIG. 1, the high pressure turbine 150 and the low pressure turbine 144 are driven by the force of the exhaust emissions and in turn drive the high pressure compressor 148 and the low pressure compressor 142 respectively. In one embodiment, the system 100 includes a high pressure turbine (HPT) bypass line 158 having a valve 160 that may be operated to route the exhaust emissions directly through the low pressure turbine 144 bypassing the high pressure turbine 150. In another embodiment, the system 100 also includes a valve 162 located in a fluid line 164 connecting the EGR loop 116 and the exhaust manifold 112 for controlling flow of exhaust emissions in the EGR loop 156. In a non-limiting example, the system 100 may include a single staged turbocharger (not shown) configured to provide compressed air to the dual-fuel engine 102 through the intake manifold 110.

The system 100 further includes a processor-based device 166 communicatively coupled to various sensors 168 and components of the system 100 such as the port injectors 124, 134, and the direct injectors 118, 132 throughout the system 100. As shown, in one embodiment of the present invention, a first sensor 168a and a second sensor 168b are disposed on each cylinder 104 (of which sensors 168 disposed on only one cylinder 104 is shown) and communicatively coupled to the processor-based device 166 via links 170a, 170b respectively. Further, a third sensor 168c and a fourth sensor 168d are disposed on the intake manifold 110 and communicatively coupled to the processor-based device 166 via links 171a, 171b respectively. Similarly, a fifth sensor 168e and a sixth sensor 168f are disposed on the outlet manifold 112 and communicatively coupled to the processor-based device 166 via links 172a, 172b respectively. For illustration purpose the sensors 168e, 168f are shown to be mounted/disposed on the exhaust manifold 112 corresponding to non-donor cylinders 108. Further, the sensors 168e, 168f may be mounted on the EGR loop 116. Alternately, the sensors 168e, 168f may be mounted at a location in the exhaust manifold 112, where the exhaust from both the donor and non-donor cylinders 106, 108 respectively are merged before discharging to the high pressure turbine 150 or the bypass line 158. The processor-based device 166 further includes an electrical link 174 communicatively coupled with each direct injector 118, 132 (of which only a single connection is shown) and an electrical link 176 communicatively coupled with each port injector 124, 134 (of which only a single connection is shown). Thus, the processor-based device 166 is configured to, during a single engine cycle among the plurality of engine cycles, regulate the direct injectors 118, 132 and the port injectors 124, 134 in each of the donor cylinder group 106 and the non-donor cylinder group 108 respectively, such that there is an optimal quantity of first fuel 120 and second fuel 128 being injected to each cylinder 104. This operation of optimal fueling may reduce the risk of knocking and peak cylinder pressure issue in each cylinder 104, while maintaining a required mean effective pressure (i.e. total power output) of the plurality of cylinders 104 and high substitution rate of the first fuel (i.e. natural gas).

In one embodiment, the first sensor 168a may employ a direct method to determine a quantity of the first fuel 120 being injected to each cylinder 104. In such embodiments, the first sensor 168a may include a mass-flow meter (i.e. fuel metering device) which may be configured to determine quantity of the first fuel 120 being injected to each cylinder 104. In some other embodiment, the quantity of first fuel 120 being injected to each cylinder 104 may be known or pre-determined by the time of fuel injection to each cylinder 104. In such embodiments, the quantity of first fuel 120 injected into each cylinder 104 is based on a commanded injection duration for the respective port injector 126, 136.

In such embodiments, the first sensor 168a may not be required. The second sensor 168b may determine i) an intake pressure at each cylinder 104 and ii) the exhaust pressure from each cylinder 104. In such embodiments, the second sensor 168b may include a pressure sensor.

The third sensor 168c may determine the intake manifold 110 pressure and the fourth sensor 168d may determine the intake manifold 100 temperature. In one embodiment, the third sensor 168c may be a pressure sensor configured to i) determine pressure of the air in the intake manifold 110 and/or ii) determine pressure of the air in the intake manifold 110 and the pressure of the exhaust emissions received from EGR loop 116. The fourth sensor 168d may be a temperature sensor or a thermostat configured to i) determine temperature of the air in the intake manifold 110 and/or ii) determine temperature of the air in the intake manifold 110 and temperature of the exhaust emissions received from EGR loop 116.

The fifth sensor 168e may determine the exhaust manifold 112 pressure and the sixth sensor 168d may determine in the exhaust manifold 112 temperature. Specifically, in one embodiment, the fifth sensor 168e may be a pressure sensor configured to determine pressure of the exhaust emissions in the exhaust manifold 112. The sixth sensor 168e may be a temperature sensor or a thermostat configured to determine temperature of the exhaust emissions in the exhaust manifold 112.

In certain other embodiments, an indirect method may be employed to determine i) the quantity of the first fuel 120 being injected to each cylinder 104, and ii) the quantity of the exhaust from each cylinder 104. In such embodiments, the sensor 168 may provide a plurality of first and second parameters to the processor-based device 166 to determine the quantity of the first fuel 120 and the quantity of the exhaust respectively. The plurality of first parameters may include i) intake air pressure, ii) engine speed, iii) manifold vacuum or pressure, iv) temperature of engine coolant, v) throttle valve position, vi) intake manifold airflow, and vii) commanded injection duration for the port injector. The plurality of second parameters may include i) flow velocity from each cylinder 104, and ii) density of the exhaust from each cylinder 104. As explained earlier, in or more embodiments, the quantity of the first fuel 120 being injected to each cylinder 104 may be known or pre-determined by the time of fuel injection to each cylinder 104.

In one embodiment, the processor-based device 166 includes at least one arithmetic logic unit, a microprocessor, a general purpose controller or a processor array to perform desired computations and/or run a computer program. Further, the processor-based device 166 may include a memory which is configured to be accessed by the processor, store one or more look-up tables, and a plurality of data received from the various sensors 168. In one exemplary embodiment, the memory may be a non-transitory storage medium, for example, a dynamic random access memory (DRAM) device, a static random access memory (SRAM) device, flash memory and the like. In one specific embodiment, a non-transitory computer readable medium (not shown) may be encoded with a computer program to instruct the processor-based device 166 to determine the optimal substitution rate of fuels 120, 128, and control the direct injectors 118, 132, the port injectors 124, 134, the first fuel source 122 such that there is an optimal quantity of first fuel 120 and second fuel 130 being injected into each cylinder 104 104 in the donor cylinder group 106 and the non-donor cylinder group 108. In certain embodiments, the processor-based device 166 is an electronic control unit (ECU).

FIG. 2 schematically shows a portion 178 of the system 100 configured to determine a substitution rate of fuels 120, 128 for each cylinder 104 and to control the fuels 120, 128 being injected to each cylinder 104 in accordance with the exemplary embodiment of FIG. 1.

For illustrative purpose, only three cylinders are shown in FIG. 2 and such illustration should not be construed as a limitation of the present invention. The plurality of cylinders 104 may belong to the donor cylinder group 106 and/or to the non-donor cylinder group 108 (as shown in FIG. 1). The plurality of cylinders 104 includes a first cylinder 104a, a second cylinder 104b, and a third cylinder 104c. The system 100 includes the port injectors 124, 134 configured to inject the first fuel 120 to the first cylinder 104a and second cylinder 104b respectively via the plurality of first intake passages 126 (as shown in FIG. 1). Similarly, in the illustrated embodiment, the system 100 includes a port injector 180 configured to inject the first fuel 120 to the third cylinder 104c via the first intake passage 126. The first cylinder 104a and second cylinder 104b include direct injectors 118, 132 configured to directly inject the second fuel 128. Similarly, in the illustrated embodiment, the third cylinder 104c includes a direct injector 182 configured to directly inject the second fuel 128. In the illustrated embodiment, each cylinder 104 includes an intake valve 184 configured for allowing the flow of a mixture of air (not shown in FIG. 2) and the first fuel 120 into each cylinder 104. Similarly, each cylinder 104 includes an outlet valve 184 configured for allowing the exhausts to flow out from the corresponding cylinder 104. Also, the illustrated embodiment has a piston 188 disposed within each cylinder among the plurality of cylinders 104.

During operation of the system 100, the first sensor 168a (as shown in FIG. 1) is configured for directly determining the quantity of first fuel 120 being injected to each cylinder 104 in each engine cycle. Alternately, as explained earlier, the quantity of the first fuel 120 being injected to each cylinder 104 may be known or pre-determined by the time of fuel injection to each cylinder 104. While the system 100 employs the indirect method, the first sensor 168a may provide the plurality of first parameters to the processor-based device 166 to determine the quantity of the first fuel 120 being injected to the cylinders 104a, 104b, and 104c. The processor-based device 166 which is communicatively coupled to the first sensor 168a via the link 170a (as shown in FIG. 1) receives the quantity of first fuel 120 being injected to each cylinder 104 in each engine cycle.

The second sensor 168b determines i) the intake pressure at each cylinder 104 in each engine cycle 104 and ii) the exhaust pressure from each cylinder 104 in each engine cycle. In one embodiment, the intake pressure at each cylinder 104 may relate to the pressure of the first fuel 120, the second fuel 128, and air at each cylinder 104 and the exhaust pressure from each cylinder 104 may relate to the exhaust emissions pressure from each cylinder 104. The processor-based device 166 which is communicatively coupled to the second sensor 168b via the link 170b (as shown in FIG. 1) receives the determined pressure of the exhaust and intake at each cylinder, and calculates the quantity of exhaust residuals 190 in the cylinders 104a, 104b, and 104c. In one embodiment, the exhaust residuals 190 may include a fraction of burnt combustion gases remaining in each cylinder 104 between each engine cycle among the plurality of engine cycles.

The processor-based device 166 may use a computer model to determine the quantity of exhaust residuals 190 in each cylinder 104 based on the received data such as pressure of the exhaust from each cylinder 104 and intake pressure at each cylinder 104. In such embodiments, the computer model may be stored in the memory of the processor-based device 166 and may be executable by the processor disposed in the processor-based device 166. In another embodiment, experimental results and/or experimental models may be used for determining the quantity of exhaust residuals 190 in each cylinder 104. While in certain other embodiments, a look-up table may be used for determining the quantity of exhaust residuals 190. In such embodiments, the determined pressure of the exhaust from each cylinder 104 and intake pressure at each cylinder 104 may be mapped with a plurality of actual data in the look-up table to determine the quantity of exhaust residuals 190 per each cycle.

The third sensor 168c (as shown in FIG. 1) is configured for determined the intake manifold 110 pressure, and the fourth sensor 168d is configured for determined the intake manifold 110 temperature. The processor-based device 166 which is communicatively coupled to the third sensor 168c and fourth sensor 168d via the link 171a and link 171b (as shown in FIG. 1) receives the determined intake manifold 110 pressure and temperature. Similarly, the fifth sensor 168e (as shown in FIG. 1) is configured for determining the exhaust manifold 112 pressure, and the sixth sensor 168f is configured for determining the exhaust manifold 112 temperature. The processor-based device 166 which is communicatively coupled to the fifth sensor 168e and sixth sensor 168f via the link 172a and link 172b (as shown in FIG. 1) receives the determined exhaust manifold 112 pressure and temperature.

In one embodiment, the processor-based device 166 is configured to calculate a characteristic temperature 192, for example a pre-combustion temperature, of each cylinder 104 based on the quantity of exhaust residuals 190 in each cylinder 104 after each cycle, at least one of the intake and exhaust manifolds 110, 112 temperature, at least one of the intake and exhaust manifolds 110, 112 pressure, and the quantity of first fuel 120 being injected to each cylinder 104. The processor-based device 166 may use a computer model to calculate a characteristic temperature 192a, 192b, and 192c of the corresponding cylinders 104a, 104b, and 104c. In such embodiments, the computer model may be stored in the memory of the processor-based device 166 and may be executable by the processor disposed in the processor-based device 166. In another embodiment, experimental results and/or experimental models may be used for calculating the characteristic temperature 192. While in certain other embodiments, a look-up table may be used for calculating the characteristic temperature 192 of each cylinder 104. In such embodiments, the determined quantity of exhaust residuals 190, at least one of the intake and exhaust manifolds 110, 112 temperature, and at least one of the intake and exhaust manifolds 110, 112 pressure may be mapped with a plurality of actual data in the look-up table to determine the characteristic temperature 192 of each cylinder 104.

In one preferred embodiment of the present invention, the characteristic temperature 192 relates to the pre-combustion temperature of each cylinder 104. In such embodiments, the pre-combustion temperature relates to temperature of each cylinder 104 before start of combustion, but late into the engine cycle between about −90 degrees to about 15 degrees of location of piston 188 (as shown in FIG. 2). While in one or more embodiments, the characteristic temperature 192 of each cylinder 104 per each engine cycle includes at least one of a burnt gas temperature in each cylinder 104, an unburnt gas temperature in each cylinder 104, and an average temperature before an initiation of combustion, in each cylinder 104. In such embodiments, the unburnt gas temperature relates to temperature of gaseous medium (exhaust) at or near peak cylinder pressure of each cylinder 104. Similarly, the average temperature relates to burnt and/or unburnt gas temperature during a portion of combustion or complete combustion or during compression of the fuels 120, 128. This temperature may be averaged over a pre-defined time or at crank angle in a range from about −90 degrees to about 90 degrees or at some predefined subset angle. Further, the characteristic temperature may relate to temperature at peak cylinder pressure.

The processor-based device 166 may further receive a plurality of operating parameters of the engine 102 via a plurality of sensors (not shown in FIGS. 1 and 2) disposed in the engine 102. In some other embodiments, the plurality of operating parameters may be a control parameter obtained from the system 100 or a design parameter obtained by manufacturers. In one or more embodiments, the plurality of operating parameters may include an ambient temperature, an ambient altitude, a load on the engine 102, an exhaust gas re-circulation rate, an intake valve closure timing, a variable compression rate, a quantity of water injection, a ratio of water to air, a temperature at the intake valve closure, an engine speed, exhaust temperature, and speed of the system 100. In such embodiments, the processor-based device 166 is further configured to calculate the characteristic temperature 192 of each cylinder 104 based on the quantity of exhaust residuals, at least one of the intake and exhaust manifolds 110, 112 temperature, at least one of the intake and exhaust manifolds 110, 112 pressure, the quantity of first fuel being injected to each cylinder 104, and the plurality of operating parameters of the engine 102. In one or more embodiments, the following operating parameters i) intake valve closure timing, and ii) variable compression rate may be either the control parameter or may be the design parameter. The exhaust temperature may be the port injector temperature, the exhaust manifold temperature, and a pre-turbine temperature of the system 100.

In one embodiment, the processor-based device 166 is configured for determining a maximum achievable substitution rate of the first fuel 120 for each cylinder 104 based on the determined characteristic temperature 192. The processor-based device 166 maps the characteristic temperature 192 with an associated look-up table so as to measure the substitution rate for each cylinder 104. In one or more embodiments, the look-up table may include a plurality of actual characteristic temperatures and the associated substitution rate. In one embodiment, the plurality of actual characteristic temperatures and the associated substitution rate in the look-up table may relate to actual data or an experimental data of the engine 102.

In one embodiment, the term "substitution rate" may be defined as a fraction of energy from the first fuel 120 with respect to total fuel energy (i.e. sum of first and second fuels 120, 128) in each cylinder 104.

In one non-limiting example, the characteristic temperature 192 and the substitution rate may be inversely proportional to each other. In such embodiments, the cylinder 104 having a high characteristic temperature 192 may have a less substitution rate of first fuel 120, the cylinder 104 having a moderate characteristic temperature 192 may have a moderate substitution rate of first fuel 120, and the cylinder 104 having a less characteristic temperature 192 may have a high substitution rate of the first fuel 120. In some other embodiment, the characteristic temperature 192 and the substitution rate may be directly proportional to each other.

In the illustrated embodiment, the processor-based device 166 maps the calculated characteristic temperature 192*a* with the actual characteristic temperature listed in the look-up table and determine the substitution rate of the first fuel 120 for the first cylinder 104*a*. Similarly, the processor-based device 166 maps the calculated characteristic temperature 192*b*, 192*c* with the actual characteristic temperature listed in the look-up table to determine the substitution rate of the first fuel 120 for the second and third cylinders 104*b*, 104*c* respectively. In one non-limiting example, based on the characteristic temperature 192 of the each cylinder 104, the substitution rate of the first fuel 120 is about 90 percent for the first cylinder 104*a*, the substitution rate of the first fuel 120 is about 60 percent for the second cylinder 104*b*, and the substitution rate of the first fuel 120 for the third cylinder 104*c* is about 30 percent. In one embodiment, the third cylinder 104*c* having a high characteristic temperature 192 may be fed with less quantity/percent of the first fuel 120 to avoid knocking or violation of the peak cylinder pressure. Similarly, the first cylinder 104*a* having a less characteristic temperature 192 may be fed with high quantity/percent of the first fuel 120.

The processor-based device 166 is further configured for controlling the quantity of the first fuel 120, and the quantity of the second fuel 128 being injected to each cylinder 104 based on achieving up to the calculated substitution rate. Specifically, the processor-based device regulates the port injectors 124, 134, 180 and direct injectors 118, 132, 182 via the electrical links 176, 174 for injecting the first and second fuels 120, 128 respectively based on the determined substitution rate. In one or more embodiments, controlling the quantity of first fuel 120 being injected to each cylinder 104 includes checking the quantity of the first fuel 120 per the determined substitution rate and allowing either less quantity or equal quantity of the first fuel 120 to each cylinder 104.

In one embodiment, the quantity of the second fuel 128 being injected to each cylinder 104 may be held constant irrespective of the calculated maximum substitution rate of the first fuel 120. In such embodiments, each cylinder 104 provides a varied effective pressure (i.e. power output) per each cycle. For example, the first cylinder 104*a* may receive constant 10 percent of the second fuel 128, and about 70 percent of the first fuel 120 based on the calculated substitution rate for the first cylinder 104*a*. In such embodiments, the first cylinder 104*a* provides the varied effective pressure per each cycle.

In another embodiment, the quantity of the second fuel 128 being injected to each cylinder 104 may vary in proportion to the calculated maximum substitution rate of the first fuel 120. In such embodiments, each cylinder 104 provides a constant mean effective pressure per each cycle. For example, the first cylinder 104*a* may receive 90 percent of the first fuel 120 based on the calculated substitution rate, and the varying proportion of about 10 percent of the second fuel 128. In such embodiments, the first cylinder 104*a* provides the constant mean effective pressure per each cycle.

In certain other embodiments, the controlling of the port injectors 124, 134, and 180, and direct injectors 118, 132, and 182 is further based on a mean effective pressure (i.e. total power output) of the plurality of cylinders 104. In such embodiments, the one or more cylinders 104 may have varied power output per each cycle, but the plurality of cylinders 104 may have a constant total power output per each cycle. For example in one embodiment, the first cylinder 104*a* may receive about 90 percent of first fuel 120 and about constant 5 percent of second fuel 128 so as to have varied power output from the first cylinder 104*a*. However, the second and third cylinders 104*b*, 104*c* may receive about 60 percent and about 30 percent of first fuel 120 and varying proportion of the second fuel 128 i.e. about 40 percent and about 70 percent of the second fuel 128 respectively such that the plurality of cylinders 104 have the constant power output per each cycle.

In one non-limiting example, the plurality of cylinders 104 providing the constant total power output receives the first fuel 120 in a range from about 95 percent to about 35 percent of a total fuel combusted in each cylinder 104, and the second fuel 128 in the range from about 5 percent to about 65 percent of the total fuel combusted in each cylinder 104. This allows more consumption of the first fuel 120 and thereby, resulting in economical operation of the dual-fuel engine 102. This operation of differential/optimal fueling may be carried out during high load or high ambient temperature conditions.

In one embodiment, during low power load conditions or low ambient temperature conditions, the processor-based device 166 may be configured to operate the port injectors 124, 134, 180 to provide an optimal first fuel 120 injection timing so as to obtain higher substitution rate of the first fuel 120. This causes less emission from the plurality of cylinders 104. Similarly, during high power load conditions or high ambient temperature conditions, the processor-based device 166 may be configured to operate the direct injectors 118, 132, 182 to provide an optimal first fuel 120 injection timing so as to obtain less substitution rate of the first fuel 120. This causes high emission from the plurality of cylinders 104 with increased amounts of carbon monoxide. The recirculation of the emissions via the exhaust gas recirculation (EGR) loop 116 into the intake manifold 110 (as shown in FIG. 1) may help in further oxidizing the carbon monoxide in both donor and non-donor cylinder groups 106, and 108 thereby regulating the emissions from the plurality of cylinders 104.

FIG. 3 schematically shows a portion 194 of a system 200 to control fumigation and direct injection of fuels 220, 228 in accordance with one exemplary embodiment.

Referring to the drawings wherein identical reference numerals denote the same elements throughout the various views, FIG. 3 schematically shows the system 200 for controlling a dual-fuel engine 202 in accordance with an example of the present invention. In the illustrated embodiment, the dual-fuel engine 202 includes a plurality of cylinders 204 (of which only three cylinders are shown in FIG. 3) which may be grouped into a donor cylinder group and a non-donor cylinder group (as shown and explained with respect to the embodiments of FIGS. 1 and 2). In the illustrated embodiment, the plurality of cylinders 204 includes a first cylinder 204*a*, a second cylinder 204*b*, and a third cylinder 204*c*.

The plurality of cylinders 204 is coupled to an intake manifold 210 that is configured to feed air passing through an after-cooler 254 (as explained in FIG. 1). Further, the dual-fuel engine 202 includes a first fuel source 222 coupled to the intake manifold 210 for feeding a first fuel 220 into the intake manifold 210. In one embodiment, the first fuel 120 may include at least one of natural gas, nitrogen, hydrogen, syngas, gasoline, ethanol, carbon monoxide, propane, biogas, liquid petroleum gas (LPG). The air and the first fuel 210 may be mixed thoroughly before feeding (i.e. fumigating) the plurality of cylinders 204 via the intake valve 284 configured for allowing the flow of the mixture of air and the first fuel 220 into each cylinder 104. Each cylinder 204 further includes a direct injector 218 that injects a second fuel 228 from a second fuel source 230. In one embodiment, the second fuel 228 includes a diesel fuel. In the illustrated embodiment, the first cylinder 204*a* includes a first direct injector 218*a*, the second cylinder 204*b* includes a second direct injector 218*b*, and the third cylinder 204*c* includes a third direct injector 218*c*.

The dual-fuel engine 202 further includes an exhaust manifold (as shown in FIG. 1) for flowing out exhaust emissions from the plurality of cylinders 204. The intake manifold 210 is further coupled to an exhaust gas recirculation loop 216 (as explained in FIG. 1) for feeding a portion of the exhaust emissions from the plurality of cylinders 204 via an exhaust gas recirculation cooler 256 (EGR-cooler) into the intake manifold 210. It may be obvious to one skilled in the art that the invention described herein may be applied to system 200 with or without EGR-cooler 256 and should not be construed as a limitation of the present invention.

As illustrated in the embodiments of FIGS. 1 and 2, the system 200 includes a processor-based device 266 communicatively coupled to various sensors (not shown in FIG. 3) and components of the engine 202 such as the first fuel source 222 and the direct injector 218. The plurality of sensors may be disposed on the plurality of cylinders 204, intake and exhaust manifolds 210, 212 respectively for receiving one or more parameters and/or determined values, and the like. The processor-based device 266 further includes an electrical link 274 communicatively coupled with each direct injector 218*a*, 218*b*, 218*c* and an electrical link 276 communicatively coupled with the first fuel source 222. Thus, the processor-based device 266 is configured to, during a single engine cycle among the plurality of engine cycles, regulate the first fuel source 222 and the direct injector 218 for fumigating and injecting the fuels 220, 228 into the plurality of cylinders 204, such that there is an optimal quantity of the first fuel 220 and second fuel 228 being injected to each cylinder 204. This operation of optimal fueling may reduce the risk of knocking and peak cylinder pressure issue in each cylinder 204, while maintaining a required mean effective pressure (i.e. total power output) of the plurality of cylinders 204, which will be explained in greater detail below.

As explained with respect to the embodiments of FIGS. 1 and 2, during operation of the system 200, the processor-based device 266 determines a quantity of exhaust residuals 290 in each cylinder 204 and calculates a characteristic temperature 292 of each cylinder 204 based on the quantity of exhaust residuals 290, at least one of an intake and exhaust manifolds 210, 212 temperature, at least one of an intake and exhaust manifold 210, 212 pressure, and a quantity of the first fuel 220 being injected to each cylinder 204. In another embodiment, the characteristic temperature 292 may be further calculated based on a plurality of operating parameters of the engine 202 such as an ambient temperature, an ambient altitude, a load on the engine 202, an exhaust gas re-circulation rate, an intake valve closure timing, a variable compression rate, a quantity of water injection, a ratio of water to air, a temperature at the intake valve closure, an engine speed, exhaust temperature, and speed of the system 200. In one embodiment, one or more variants of the characteristic temperature 292 are similar to the one or more variants of the characteristic temperature 292 as explained with respect to the embodiment of FIG. 2. The processor-based device 266 further determines a substitution rate of the first fuel 220 for each cylinder 204. In one embodiment, the substitution rate is determined by mapping the characteristic temperature 290 with an associated look-up table as explained in the embodiment of FIG. 2.

In one non-limiting example, the characteristic temperature 292 from the plurality of cylinders 204 may be averaged before determining the substitution rate. In one embodiment, during one engine cycle among the plurality of engine cycles, the first cylinder 204a has a high characteristic temperature 292a, the second cylinder 204b has a moderate characteristic temperature 292b, and the third cylinder 204c has a less characteristic temperature 292c. In such embodiments, the first, second, and third cylinders 204a, 204b, 204c may receive the first fuel 220 having a same substitution rate. Further, in such embodiments, the second fuel 228 may be varied based on the substitution rate of the first fuel 220 so as to maintain a constant mean effective pressure from the plurality of cylinders 204.

The processor-based device 266 further controls at least one of the quantity of the first fuel 220 and a quantity of second fuel 228 being injected to each cylinder 204 based on the determined substitution rate. In one or more embodiments, the controlling is further based on a mean effective pressure of the plurality of cylinders 204 as explained in the embodiment of FIG. 2. Specifically, in one embodiment, based on the determined substitution rate and/or the mean effective pressure of the plurality of cylinders 204, the processor-based device 266 is configured to regulate the fumigation of first fuel 220 into the plurality of cylinders 204 via the intake manifold 210. In such embodiments, the first fuel 120 and the air flowing in the intake manifold 210 are mixed thoroughly before being fed/fumigated to each cylinder 204. In some other embodiments, the fumigation of the plurality of cylinders 204 may be performed during some predetermined condition such as an early injection of fuels 220, 228 i.e. during system 200 start-up or may be applicable to the engine 202 configured for direct injection of the first fuel 220.

In the illustrated embodiment, the first cylinder 204a has a first characteristic temperature 292a, the second cylinder 204b has a second characteristic temperature 292b, and the third cylinder 204c has a third characteristic temperature 292c. As shown in FIG. 3, the first characteristic temperature 292a is low, the second characteristic temperature 292b is moderate, and second characteristic temperature 292c is high. The processor-based device 266 determines the substitution rate of the first fuel 220 and controls the first fuel source 222 and the direct injector 218 based on the determined substitution rate and/or the mean effective pressure of the plurality of cylinders 204. In such embodiments, the first fuel source 222 may fumigate the plurality of cylinders 204 with the first fuel 220 in a range from about 30 to about 70 percent of a total fuel combusted in the plurality of cylinders 204. Further, the direct injector 228a may inject relatively less quantity of the second fuel 228 to the first cylinder 204a, moderate quantity of the second fuel 228 to the second cylinder 204b, and relatively high quantity of the second fuel 228 to the third cylinder 204c.

FIG. 4 is a flow chart illustrating a method 302 of controlling dual-fuel engines 102 and 202 in accordance with one exemplary embodiment of the present invention.

The method 302 includes a step 304 for determining a quantity of exhaust residuals in each cylinder among a plurality of cylinders in the engine. In one embodiment, the quantity of exhaust residuals in each cylinder is determined based on an exhaust pressure from each cylinder and an intake pressure at each cylinder. Various sensors may be used for determining the exhaust pressure from each cylinder and the intake pressure at each cylinder. The processor-based device may run a computer model with the exhaust pressure and the intake pressure to determine the quantity of exhaust residuals (trapped residuals) in each cylinder.

Further, the method 302 includes a step 306 for determining at least one of an intake and exhaust manifolds temperature, at least one of the intake and exhaust manifolds pressure, and a quantity of a first fuel being injected to each cylinder. In one embodiment, various sensors may be used for determining the intake and exhaust manifolds temperature and pressure, and the quantity of the first fuel.

The method 302 further includes a step 308 of calculating a characteristic temperature of each cylinder based on the quantity of exhaust residuals, at least one of the intake and exhaust manifolds temperature, at least one of the intake and exhaust manifolds pressure, and the quantity of the first fuel. In one embodiment, the processor-based device may run a computer model with the data related to the exhaust residuals, the intake and exhaust manifolds temperature, the intake and exhaust manifolds pressure, and the quantity of the first fuel to determine the characteristic temperature of each cylinder. In certain other embodiments, the step of calculating 308 the characteristic temperature of each cylinder 104 may be further based on a plurality of operating parameters of the engine. In one embodiment, one or more variants of the characteristic temperature are similar to the one or more variants of the characteristic temperature as explained with respect to the embodiment of FIG. 2.

Further, the method 302 includes a step 310 determining a substitution rate of the first fuel for each cylinder based on the characteristic temperature. The processor-based device may map the characteristic temperature with an associated look-up table to measure the substitution rate of the first fuel for each cylinder.

The method 302 further includes step 312 of controlling at least one of the quantity of the first fuel, and a quantity of a second fuel being injected to each cylinder based on the substitution rate. In one embodiment, the processor-based device is communicatively coupled to a port injector and a direct injector for regulating the first fuel and the second fuel being injected into each cylinder based on the maximum allowable substitution rate. Specifically, the processor-based device may regulate the volume fraction or quantity of first fuel being injected to each cylinder to achieve economical operation of the dual-fuel engine while avoiding operating conditions that exhibit knock, poor combustion, or excessive emissions. By having an increase in the overall substitution rate the performance and efficiency of the system will be enhanced. In another embodiment, the processor-based device is communicatively coupled to a first fuel source and a direct injector for regulating the first fuel being fumigated to the plurality of cylinders and the second fuel being injected into each cylinder based on the maximum allowable substitution rate. Specifically, the processor-based device may regulate the volume fraction or quantity of first fuel being injected to the plurality of cylinders to achieve economical operation of the dual-fuel engine while avoiding operating conditions that exhibit knock, poor combustion, or excessive emissions. By having an increase in the overall substitution rate the performance and efficiency of the system will be enhanced.

In some embodiments, the step 310 of controlling is further based on a mean effective pressure (i.e. total power output) of the plurality of cylinders. In such embodiments, one or more cylinders may have varied power output but the total power output from the plurality of cylinders would be maintained steady per each cycle.

Advantageously, the present invention enables the development of a dual-fuel engine operating with low emissions requirements and high substitution rate. The present invention also allows operation with high first fuel substitution, resulting in increased use of first fuel such as natural gas and thereby reducing operational expenses of the dual-fuel engines or the reciprocating engines. In accordance with certain embodiments discussed herein, a method and system facilitates the engine having better reliability combined with high fueling or gas substitution with reduced knocking and peak cylinder pressure issue.

Furthermore, the skilled artisan will recognize the interchangeability of various features from different examples. Similarly, the various methods and features described, as well as other known equivalents for each such method and feature, can be mixed and matched by one of ordinary skill in this art to construct additional systems and techniques in accordance with principles of this disclosure. Of course, it is to be understood that not necessarily all such objects or advantages described above may be achieved in accordance with any particular example. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:

1. A method comprising:
    determining a quantity of exhaust residuals in each cylinder among a plurality of cylinders in an engine, wherein the exhaust residuals comprise a fraction of burnt combustion gases remaining in each cylinder between each engine cycle among a plurality of engine cycles;
    determining at least one of an intake and exhaust manifolds temperature, at least one of an intake and exhaust manifolds pressure, and a quantity of a first fuel being injected to each cylinder;
    calculating a characteristic temperature of each cylinder based on the quantity of exhaust residuals, at least one of the intake and exhaust manifolds temperature, at least one of the intake and exhaust manifolds pressure, and the quantity of the first fuel;
    determining a substitution rate of the first fuel for each cylinder based on the characteristic temperature; and
    controlling at least one of the quantity of the first fuel, and a quantity of a second fuel being injected to each cylinder based on the determined substitution rate.

2. The method of claim 1, wherein the first fuel comprises at least one of natural gas, nitrogen, hydrogen, syngas, gasoline, ethanol, carbon monoxide, propane, biogas, liquid petroleum gas (LPG).

3. The method of claim 1, wherein the second fuel comprises a diesel fuel.

4. The method of claim 1, wherein determining a quantity of exhaust residuals comprises:
    determining an exhaust pressure from each cylinder and an intake pressure at each cylinder; and
    calculating the quantity of exhaust residuals based on the exhaust pressure and the intake pressure.

5. The method of claim 1, wherein the calculating is further based on a plurality of operating parameters of the engine, wherein the plurality of operating parameters comprises at least one of an ambient temperature, an ambient altitude, a load on the engine, an exhaust gas re-circulation rate, an intake valve closure timing, a variable compression rate, a quantity of water injection, a ratio of water to air, a temperature at the intake valve closure, an exhaust temperature, an engine speed, and speed of the system.

6. The method of claim 1, wherein determining a substitution rate comprises mapping the characteristic temperature with an associated look-up table for measuring the substitution rate.

7. The method of claim 1, wherein the controlling is further based on a mean effective pressure of the plurality of cylinders.

8. The method of claim 1, wherein the characteristic temperature comprises a pre-combustion temperature of each cylinder.

9. The method of claim 1, wherein the characteristic temperature comprises at least one of a burnt gas temperature in each cylinder, an unburnt gas temperature in each cylinder, and an average temperature before an initiation of combustion, in each cylinder.

10. The method of claim 1, wherein the controlling comprises regulating at least one of a port injector and a direct injector or at least one of a first fuel source and the direct injector, via a processor-based device.

11. A system comprising:
    an engine including:
        a plurality of cylinders coupled to an intake manifold configured to feed a flow of air to the plurality of cylinders through a plurality of intake passages; and
        a port injector disposed in each of the plurality of intake passages and configured to inject a first fuel from a first fuel source, and a direct injector disposed in each cylinder and configured to inject a second fuel from a second fuel source; and
    a processor-based device configured to be communicatively coupled to a plurality of sensors, the port injector, and the direct injector, wherein the processor-based device is configured to:
        determine a quantity of exhaust residuals in each cylinder, wherein the exhaust residuals comprise a fraction of burnt combustion gases remaining in each cylinder between each engine cycle among a plurality of engine cycles;
        determine at least one of an intake and exhaust manifolds temperature, at least one of an intake and exhaust manifolds pressure, and a quantity of the first fuel being injected to each cylinder;
        calculate a characteristic temperature of each cylinder based on the quantity of exhaust residuals, at least one of the intake and exhaust manifolds temperature, at least one of the intake and exhaust manifolds pressure, and the quantity of the first fuel;
        determine a substitution rate of the first fuel for each cylinder based on the characteristic temperature; and
        control at least one of the quantity of the first fuel, and a quantity of the second fuel being injected to each cylinder based on the determined substitution rate.

12. The system of claim 11, wherein the first fuel comprises at least one of natural gas, nitrogen, hydrogen, syngas, gasoline, ethanol, carbon monoxide, propane, biogas, liquid petroleum gas (LPG).

13. The system of claim 11, wherein the second fuel comprises a diesel fuel.

14. The system of claim 11, wherein the processor-based device configured to determine a quantity of exhaust residuals comprises by:
   determining an exhaust pressure from each cylinder and an intake pressure at each cylinder; and
   calculating the quantity of exhaust residuals based on the exhaust pressure and the intake pressure.

15. The system of claim 11, wherein the processor-based device configured for calculating is further based on a plurality of operating parameters of the engine, wherein the plurality of operating parameters comprises at least one of an ambient temperature, an ambient altitude, a load on the engine, an exhaust gas re-circulation rate, an intake valve closure timing, a variable compression rate, a quantity of water injection, a ratio of water to air, a temperature at the intake valve closure, an engine speed, an exhaust temperature, and speed of the system.

16. The system of claim 11, wherein the processor-based device configured to determine a substitution rate comprises by mapping the characteristic temperature with an associated look-up table for measuring the substitution rate.

17. The system of claim 11, wherein the processor-based device configured for controlling is further based on a mean effective pressure of the plurality of cylinders.

18. The system of claim 11, wherein the characteristic temperature comprises a pre-combustion temperature of each cylinder.

19. The system of claim 11, wherein the characteristic temperature comprises at least one of a burnt gas temperature in each cylinder, an unburnt gas temperature in each cylinder, and an average temperature before an initiation of combustion, in each cylinder.

* * * * *